(12) United States Patent
Yamashita (10) Patent No.: US 6,374,035 B1
(45) Date of Patent: *Apr. 16, 2002

(54) SIGNAL PROCESSING DEVICE (75) Inventor: Shinichi Yamashita, Kanagawa-ken (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/511,740

(22) Filed: Aug. 7, 1995

(30) Foreign Application Priority Data

Aug. 25, 1994 (JP) .............................. 6-200575

(51) Int. Cl.[7] .......................... H04N 5/923; H04N 5/931
(52) U.S. Cl. ........................... 386/93; 386/46; 375/317; 375/341; 360/48; 360/51
(58) Field of Search ................ 386/9, 93, 40, 386/85, 113, 124; 371/43; 360/27, 73.06, 46, 51, 48, 65; 375/94, 340, 317, 65, 341, 290; H04N 5/923, 5/931

(56) References Cited

U.S. PATENT DOCUMENTS

| 4,343,023 A | * | 8/1982 | Nishimura et al. ............ 360/40 |
| 5,166,955 A | * | 11/1992 | Ohta ............................ 375/11 |
| 5,247,397 A | * | 9/1993 | Sato et al. ..................... 360/17 |
| 5,265,125 A | | 11/1993 | Ohta ............................ 375/11 |
| 5,291,499 A | * | 3/1994 | Behrens et al. ............... 371/43 |
| 5,329,554 A | * | 7/1994 | Behrens et al. ............... 375/94 |
| 5,430,744 A | * | 7/1995 | Fettweis et al. ............... 371/43 |
| 5,490,091 A | * | 2/1996 | Kogan et al. ................. 364/554 |
| 5,544,178 A | * | 8/1996 | Zook ............................ 371/43 |
| 5,563,864 A | * | 10/1996 | Kobayashi et al. ........... 369/59 |
| 5,600,664 A | * | 2/1997 | Hayashi ....................... 371/43 |

FOREIGN PATENT DOCUMENTS

| EP | 0538867 | 4/1993 |
| WO | 9323941 | 11/1993 |

OTHER PUBLICATIONS

Patent Abstracts of Japan No. JP–A–04 011361, Apr. 21, 1992, vol. 16, No. 163 (P–1341).
Patent Abstracts of Japan No. JP–A–59 077608, Aug. 29, 1984, vol. 18, No. 188 (P–297).
Globecom '90, Dec. 2–5, 1990, San Diego, pp. 1794–1799, XP 000218879, W.L. Abbott & J.M. Cioffi, "Timing Recovery For adaptive Decision Feedback Equalization of the Magnetic Storage Channel".
Compeuro '89, Proceedings VLSI and Computer Peripherals, May 8–12, 1989, Hamburg, pp. 1/91–1/96, XP 000044104, F. Dolivo, "Signal Processing For High–Density Magnetic Recording".

* cited by examiner

Primary Examiner—Vincent F. Boccio
(74) Attorney, Agent, or Firm—Robin, Blecker & Daley (57) ABSTRACT

A device is arranged to detect the level of an input digital signal by detecting a specific pattern from the input digital signal and to control the level of the input digital signal according to a result of the level detection. The arrangement enables the device to accurately detect the amplitude of a reproduced signal obtained at the detecting point of data which has the specific pattern, to keep the level of the reproduced signal unvarying at the data detecting point and to lessen errors of reproduced data.

30 Claims, 10 Drawing Sheets

FIG.3(b) PR(1,0,-1)
ONLY ZERO-CROSS POINT BEING SAMPLED AND HELD

FIG.3(a) PR(1)
CONTROL WITH BINARY DETECTION DATA

TRUTH TABLE OF ph, ah, s, sign

| a | b | c | d | e |   | b | – | d | sign | ah | s | ph |
|---|---|---|---|---|---|---|---|---|------|----|----|----|
| 0 | 0 | 0 | 0 | 0 | : | 0 | 0 | 0 | * | 1 | * | 1 |
| 1 | 0 | 0 | 0 | 0 | : | 1 | 0 | 0 | * | 1 | + | 0 |
| 0 | 1 | 0 | 0 | 0 | : | 0 | 1 | 0 | + | 0 | * | 1 |
| 1 | 1 | 0 | 0 | 0 | : | 1 | 1 | 0 | + | 0 | * | 1 |
| 0 | 0 | 1 | 0 | 0 | : | –1 | 0 | 1 | * | 1 | – | 0 |
| 1 | 0 | 1 | 0 | 0 | : | 0 | 0 | 1 | * | 1 | – | 0 |
| 0 | 1 | 1 | 0 | 0 | : | –1 | 1 | 1 | + | 0 | * | 1 |
| 1 | 1 | 1 | 0 | 0 | : | 0 | 1 | 1 | + | 0 | * | 1 |
| 0 | 0 | 0 | 1 | 0 | : | 0 | –1 | 0 | – | 0 | * | 1 |
| 1 | 0 | 0 | 1 | 0 | : | 1 | –1 | 0 | – | 0 | * | 1 |
| 0 | 1 | 0 | 1 | 0 | : | 0 | 0 | 0 | * | 1 | * | 1 |
| 1 | 1 | 0 | 1 | 0 | : | 1 | 0 | 0 | * | 1 | + | 0 |
| 0 | 0 | 1 | 1 | 0 | : | –1 | –1 | 1 | – | 0 | * | 1 |
| 1 | 0 | 1 | 1 | 0 | : | 0 | –1 | 1 | – | 0 | * | 1 |
| 0 | 1 | 1 | 1 | 0 | : | –1 | 0 | 1 | * | 1 | – | 0 |
| 1 | 1 | 1 | 1 | 0 | : | 0 | 0 | 1 | * | 1 | – | 0 |
| 0 | 0 | 0 | 0 | 1 | : | 0 | 0 | –1 | * | 1 | + | 0 |
| 1 | 0 | 0 | 0 | 1 | : | 1 | 0 | –1 | * | 1 | + | 0 |
| 0 | 1 | 0 | 0 | 1 | : | 0 | 1 | –1 | + | 0 | * | 1 |
| 1 | 1 | 0 | 0 | 1 | : | 1 | 1 | –1 | + | 0 | * | 1 |
| 0 | 0 | 1 | 0 | 1 | : | –1 | 0 | 0 | * | 1 | – | 0 |
| 1 | 0 | 1 | 0 | 1 | : | 0 | 0 | 0 | * | 1 | * | 1 |
| 0 | 1 | 1 | 0 | 1 | : | –1 | 1 | 0 | + | 0 | * | 1 |
| 1 | 1 | 1 | 0 | 1 | : | 0 | 1 | 0 | + | 0 | * | 1 |
| 0 | 0 | 0 | 1 | 1 | : | 0 | –1 | –1 | – | 0 | * | 1 |
| 1 | 0 | 0 | 1 | 1 | : | 1 | –1 | –1 | – | 0 | * | 1 |
| 0 | 1 | 0 | 1 | 1 | : | 0 | 0 | –1 | * | 1 | + | 0 |
| 1 | 1 | 0 | 1 | 1 | : | 1 | 0 | –1 | * | 1 | + | 0 |
| 0 | 0 | 1 | 1 | 1 | : | –1 | –1 | 0 | + | 0 | * | 1 |
| 1 | 0 | 1 | 1 | 1 | : | 0 | –1 | 0 | + | 0 | * | 1 |
| 0 | 1 | 1 | 1 | 1 | : | –1 | 0 | 0 | * | 1 | – | 0 |
| 1 | 1 | 1 | 1 | 1 | : | 0 | 0 | 0 | * | 1 | * | 1 |

\* : EITHER + OR –

$ph = (b \oplus c) + \bar{a}\bar{b}\bar{c}\bar{d} + abcd$
$s = c$

SIGNAL PROCESSING DEVICE

BACKGROUND OF THE INVENTION

1. Field of the Invention

This invention relates to a signal processing device and more particularly to control over the level of a digital signal reproduced from a recording medium.

2. Description of Related Art

It has been known to arrange an apparatus such as a digital VTR or the like which transmits data at a high speed (for recording or reproduction) to use a phase locked loop (hereinafter referred to as PLL) in extracting a clock signal from a data train received.

Further, in the field of digital VTRs of the kind performing high density magnetic recording, a detecting method called a "partial response 1,0,−1 method of system" (hereinafter referred to as the PR(1,0,−1) system) has come to be popularly employed in detecting reproduced data.

Figure 1:
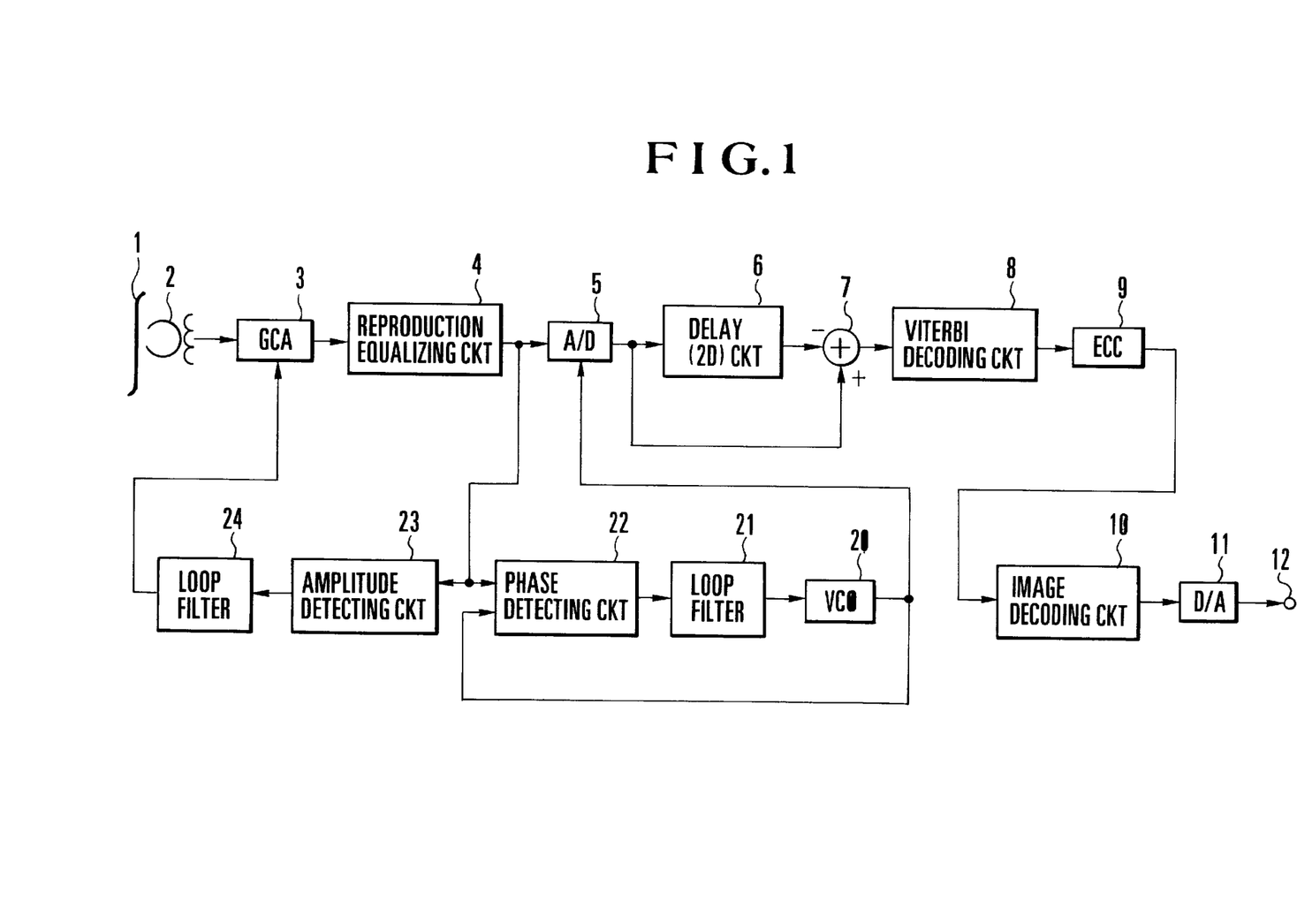
FIG. 1 is a block diagram showing the arrangement of a digital VTR.
Figure 2A:
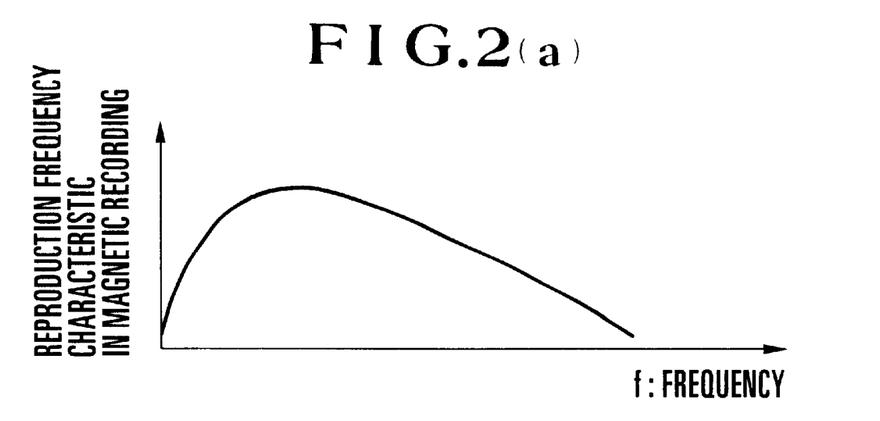
FIGS. 2(a), 2(b) and 2(c) show the characteristics of reproduced signals.
Figure 2B:
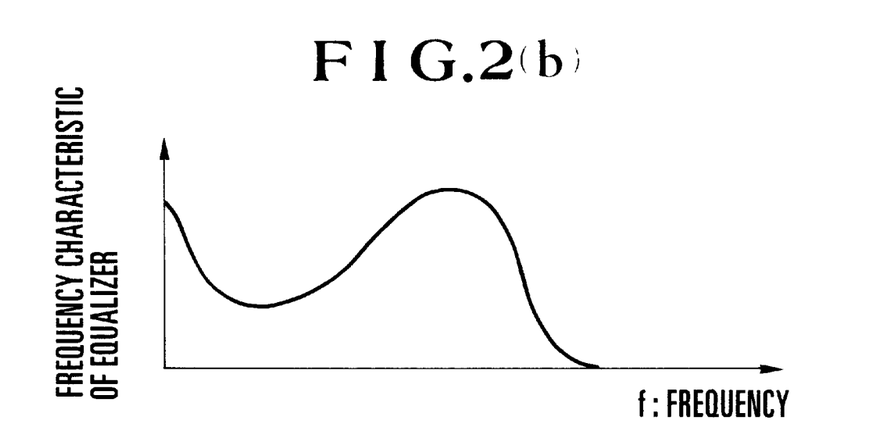
Figure 2C:
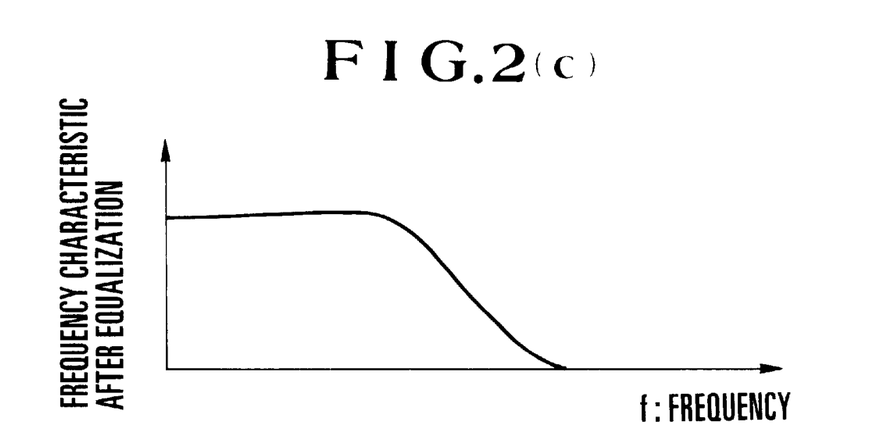

FIG. 1 is a block diagram showing by way of example the arrangement of the reproduction system of a digital VTR of the above-stated kind. Referring to FIG. 1, a digital signal recorded on a magnetic tape 1 is reproduced by a magnetic head 2. The amplitude of the reproduced digital signal is controlled by a gain control amplifier (GCA) 3 and is then supplied to a reproduction equalizing circuit 4. In a case where a longitudinal recording medium and a ring-type magnetic head are in combination, the reproduction frequency characteristic of the magnetic head 2 is as shown in FIG. 2(a). As shown, a differential characteristic is obtained for a low frequency band while an attenuating characteristic is obtained for a high frequency band due to losses of varied kinds. To solve this problem, the reproduction equalizing circuit 4 which has a frequency characteristic as shown in FIG. 2(b) is used for equalization to make the frequency characteristic into a cosine roll-off characteristic as shown in FIG. 2(c). The cosine roll-off characteristic minimizes a waveform interference at a data detecting point. The recorded data is restored by carrying out a binary discriminating action on the equalized signal.

The equalizing process described above is called an integral equalization and a process of detecting the polarity of the integrally equalized signal by means of comparator or the like is called integral detection.

Figure 3A:
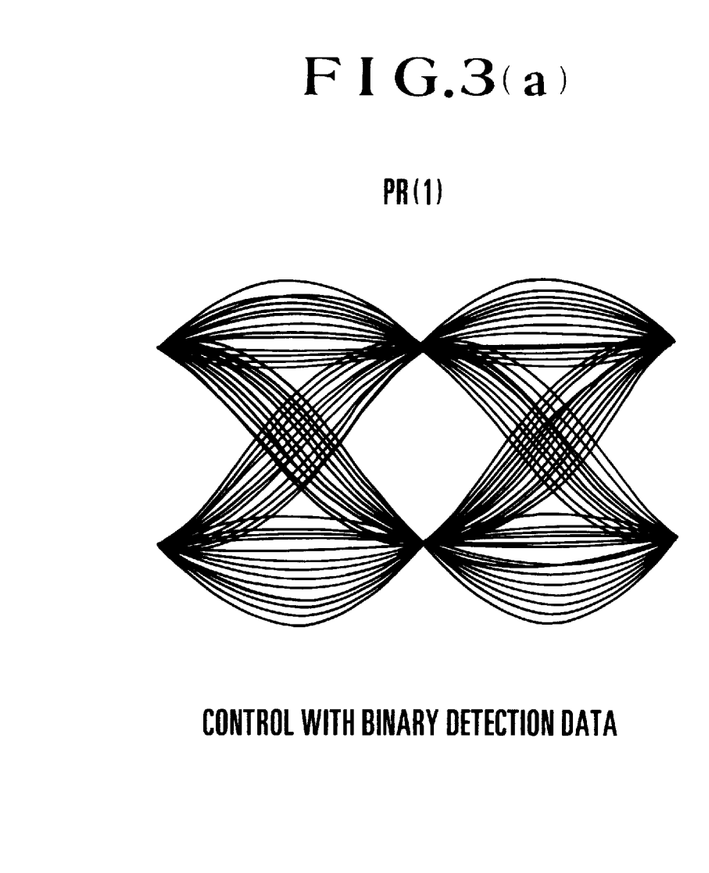
FIGS. 3(a) and 3(b) show eye patterns of reproduced signals.

The eye pattern of the signal which is integrally equalized in the above-stated manner becomes as shown in FIG. 3(a). In order to accurately detect the data, it is necessary to generate such a clock signal that permits accurate sampling at a point where a maximum eye opening is obtained. This clock signal is generated by a PLL (phase-locked loop) which consists of a phase detecting circuit 22, a loop filter 21 and a voltage controlled oscillator 20 (hereinafter referred to as VCO).

A phase difference between the clock signal generated by the VCO 20 and a signal outputted from the reproduction equalizing circuit 4 is detected by the phase detecting circuit 22. A phase difference signal thus obtained is supplied through the loop filter 21 to the VCO 20 to apply a phase lock by controlling the oscillation frequency of the VCO 20 in such a way as to make the phase difference almost zero at the phase detecting circuit 22. Further, in this instance, the phase response characteristics of the PLL such as the frequency characteristic of the loop filter 21, a gain, the sensitivity of the VCO 20, etc., are set in such a way as to adequately absorb jitters generated by the head-tape system of the VTR and not to readily respond to noises of varied kinds.

With a PLL arranged to obtain a clock signal for an A/D converter 5 in the above-stated manner, a point at which a maximum eye opening is obtained can be sampled by adjusting the phase of the lock of the PLL, for example, by adjusting the operating point of the phase detecting circuit 22. Further, in order to correctly detect data, the amplitude of the signal at the point of detection must be kept unvarying. To meet this requirement, an automatic gain control loop (hereinafter referred to as AGC loop) is formed with an amplitude detecting circuit 23, a loop filter 24 and the GCA 3.

The amplitude detecting circuit 23 includes a detection circuit which is arranged to detect the peak value of the signal equalized. The detected peak value is amplified when only a low band component of the signal is passed by the loop filter 24 and is supplied to the control terminal of the GCA 3. The gain of the GCA 3 is thus controlled to keep the amplitude detection output almost constant.

The integrally equalized signal is sampled by the A/D converter 5 under the control of the clock signal generated by the above-stated PLL and is converted into a digital signal which consists of a plurality of bits per sample thus obtained. The signal reproduced by the head 2 is of course in the form of a digital signal. However, the amplitude of the digital signal varies in an analog manner. Therefore, the A/D converter 5 converts the reproduced signal again into a digital signal consisting of a plurality of bits per sample as mentioned above.

Figure 3B:
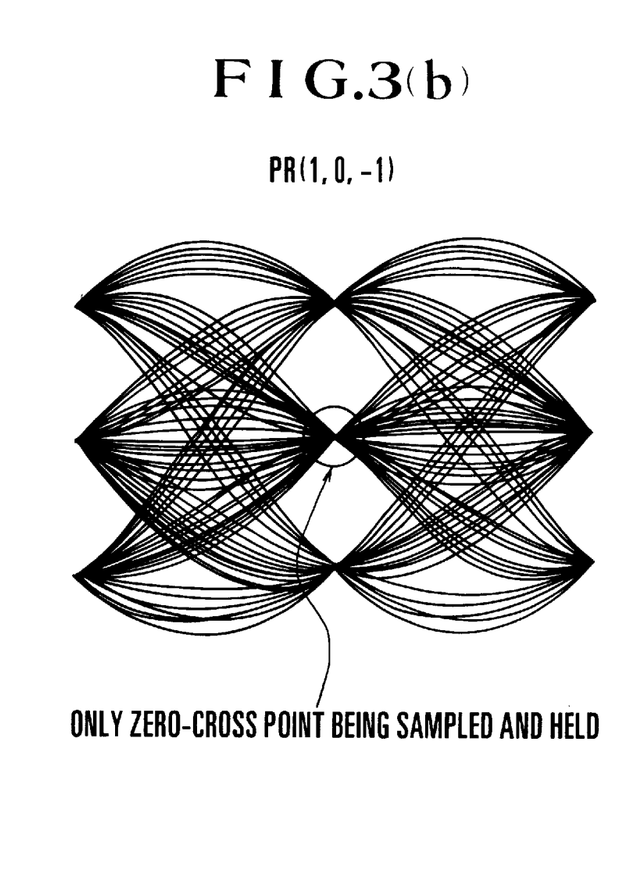

The reproduced signal which has been converted into the digital signal is delayed by a delay circuit 6 as much as the length of two clock pulses to obtain a delayed signal. The delayed signal is subtracted from the original signal by a subtracter 7. Through this process, the integrally equalized waveform is converted into a waveform having the characteristic of PR(1,0,−1) and its eye pattern has a ternary value as shown in FIG. 3(b).

This signal of the PR(1,0,−1) characteristic is supplied to a Viterbi decoding circuit 8 to be restored to the original form of binary signal of "1" and "0" by maximum likelihood decoding. In other words, the signal is outputted as a digital signal having one bit per sample.

The combination of the PR(1,0,−1) method and the Viterbi decoding is often used for a digital VTR arranged to perform high density magnetic recording. The use of this combination enables the VTR to avoid the degradation of the low band characteristic of a magnetic recording system, such as deteriorated S/N ratio and distorted waveform, and to minimize transmission errors. The reproduced data decoded by the Viterbi decoding circuit 8 is supplied to an error correcting circuit (ECC) 9 to have any error generated through a transmission route corrected by using parity data added to the signal at the time of recording. The corrected data is supplied to an image decoding circuit 10. The image decoding circuit 10 expands the amount of information of the reproduced data which has been compressed at the time of recording and then supplies its output to a D/A converter 11. The D/A converter 11 then converts the input digital data into analog data. The analog data thus obtained is outputted through an output terminal 12.

To keep the integrally equalized reproduced signal at a constant amplitude, the conventional VTR described above is arranged to peak-detect the amplitude of the equalized signal and to perform control in such a way as to keep its detection output unvarying.

However, as apparent from the eye patterns shown in FIGS. 3(a) and 3(b), the arrangement of carring out the peak detection tends to keep unvarying an amplitude obtained at some point other than a desired detection point at which the amplitude is desired to be kept unvarying. The peak voltage of the point other than the detection point varies too much depending on the pattern of data. Particularly, in the case of the waveform obtained by integrally equalizing the signal reproduced by a magnetic recording/reproduction system, a low frequency noise is superimposed on the waveform. The detected amplitude is inevitably affected by the low frequency noise to make it difficult to keep the amplitude level unvarying.

According to the conventional method, therefore, errors of reproduced data tend to increase as the data cannot be accurately detected.

SUMMARY OF THE INVENTION

It is a principal object of this invention to solve the problem of the prior art described above.

It is a more specific object of this invention to provide a signal processing device which is arranged to be capable of accurately keeping a reproduced signal at a desired level according to a data detecting point and to lessen the error of reproduced data.

Under this object, a digital signal processing device according to this invention includes pattern detecting means for detecting a specific pattern included in an input digital signal, level detecting means for detecting the level of the input digital signal on the basis of an output of the pattern detecting means, and level control means for controlling the level of the input digital signal according to the output of the level detecting means.

It is another object of this invention to provide a device which is simply arranged to be capable of controlling in an optimum manner the level of a signal obtained at a data detecting point.

It is a further object of this invention to provide a device which is simply arranged to be capable of controlling in an optimum manner the level of a signal obtained at a data detecting point and to accurately detect any phase variations of an input signal.

These and other objects and features of this invention will become apparent from the following detailed description of embodiments thereof taken in connection with the accompanying drawings.

DETAILED DESCRIPTION OF THE PREFERRED EMBODIMENTS

Some of preferred embodiments of this invention are described below with reference to the drawings.

Figure 4:
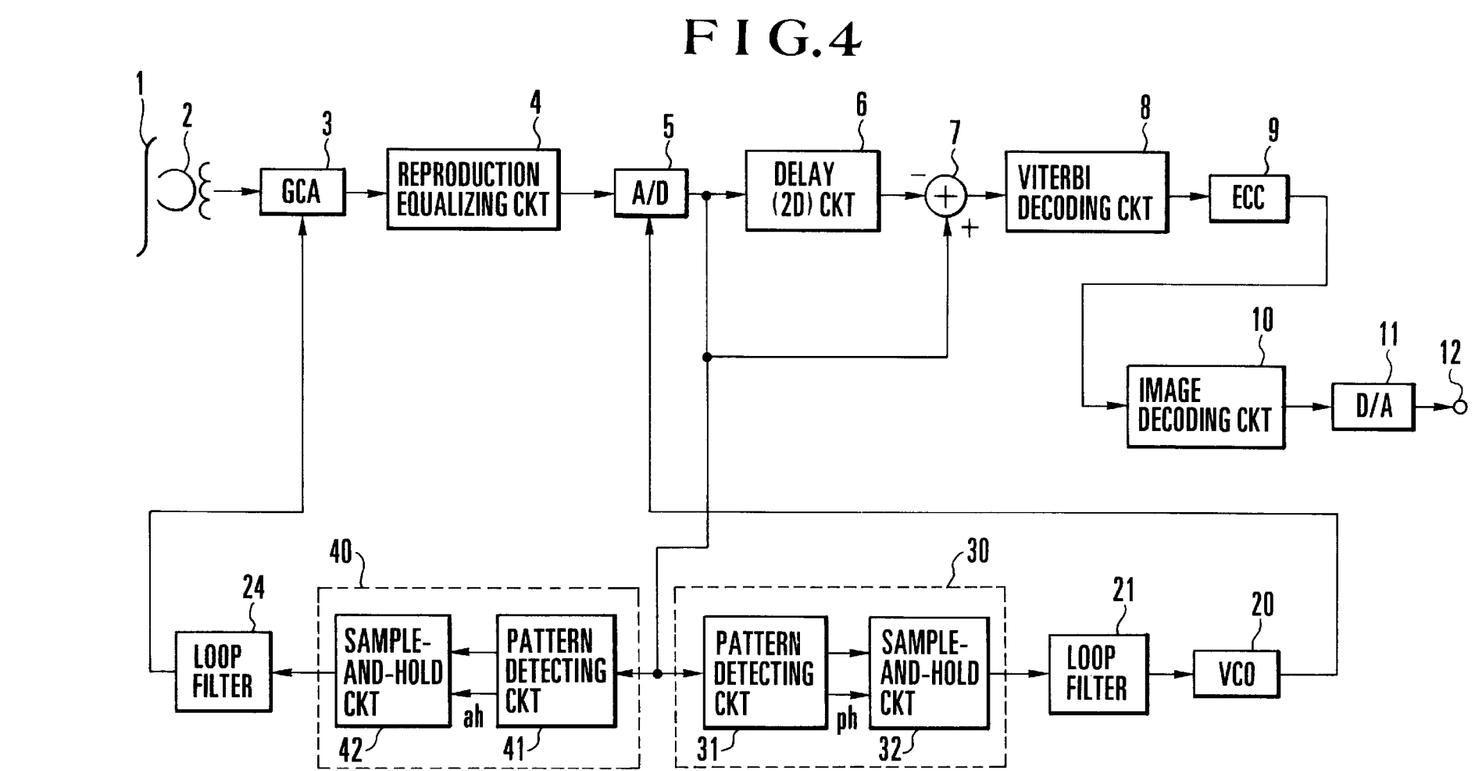
FIG. 4 is a block diagram showing a digital VTR arranged as an embodiment of this invention.

FIG. 4 shows in a block diagram the arrangement of a reproduction system included in a digital VTR which is an embodiment of this invention. In FIG. 4, all the parts of the VTR that act in the same manner as those of FIG. 1 are indicated by the same reference numerals and the details of them are omitted from the following description.

Referring to FIG. 4, a circuit which generates a clock signal for operating the A/D converter 5 is first described as follows. A digital phase detecting circuit 30 consists of a pattern detecting circuit 31 and a sample-and-hold circuit 32. A digital signal obtained by the A/D converter 5 is supplied to the pattern detecting circuit 31. The pattern detecting circuit 31 outputs a signal according to a pattern detected. In the case of this embodiment, the A/D converter 5 converts a reproduced signal into a digital signal consisting of four bits.

To the sample-and-hold circuit 32 is supplied a signal of the PR(1,0,−1) system. The PR(1,0,−1) signal is sampled and held under the control of the output of the pattern detecting circuit 31. The pattern detecting circuit 31 is arranged to detect a plurality of patterns appearing in an input signal as will be described later herein. With the plurality of patterns thus detected, a signal which corresponds to a phase difference between the reproduced signal and the clock signal used for analog-to-digital (A/D) conversion is obtained at the output of the sample-and-hold circuit 32.

Figure 5:
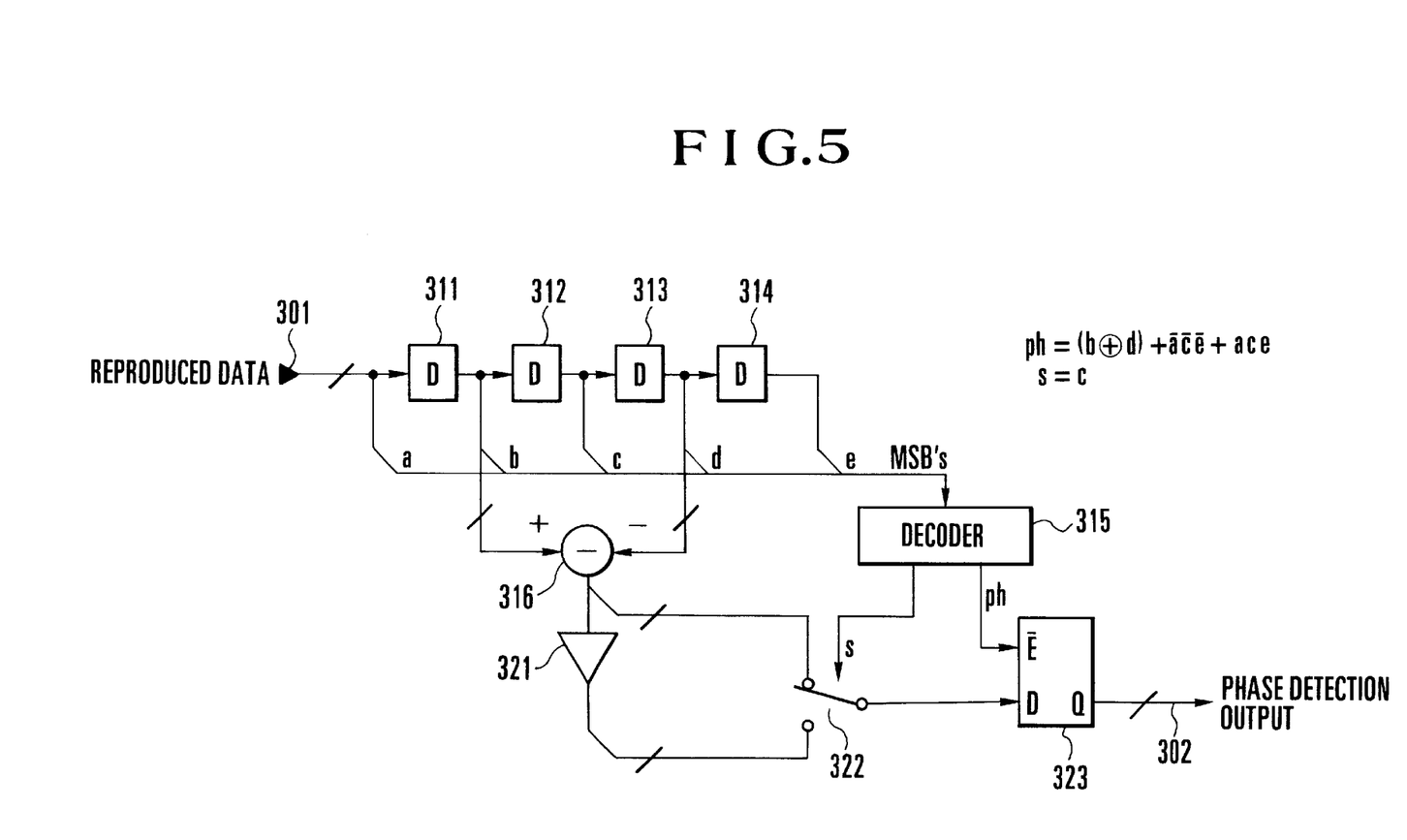
FIG. 5 is a block diagram showing the arrangement of a digital phase detecting circuit of the VTR shown in FIG. 4.

FIG. 5 is a block diagram showing in detail the arrangement of the digital phase detecting circuit 30. In the digital phase detecting circuit 30, delay circuits 311 to 314 are arranged to delay the digital signal 301 which is obtained by A/D conversion for every clock pulse. A decoder 315 is composed of a logical operation circuit which is arranged to detect a specific pattern from the outputs of the delay circuits 311 to 314. These elements 311 to 316 jointly form the pattern detecting circuit 31.

A subtracter 316 is arranged to subtract the output of the delay circuit 313 from the output of the delay circuit 311. A negation circuit 321 is arranged to negate the output of the subtracter 316. A switch 322 is arranged to perform switching between the output of the subtracter 316 and that of the negation circuit 321 in accordance with a signal s which is outputted from the decoder 315. A latch circuit 323 is arranged to sample and hold the output of the switch 322 in accordance with a signal ph outputted from the decoder 315 and to output it as a phase detection signal. These elements 316, 321, 322 and 323 jointly form the sample-and-hold circuit 32.

With the digital phase detecting circuit 30 arranged in this manner, the A/D converted reproduced signal is inputted to the delay circuit 301 to be delayed by the delay circuits 311 to 314 one after another. The outputs of the delay circuits 311 and 313 are supplied to the subtracter 316. The subtracter 316 then outputs a PR(1,0,−1) signal. The MSBs (most significant bits) of the data inputted to and of the data outputted from the delay circuits 311 to 314, each data consisting of four bits, are here assumed to be a, b, c, d and e, respectively. Then, with the mean value of the reproduced signal arranged to be in the middle of an A/D conversion range in A/D converting the reproduced signal, the MSBs a, b, c, d and e become a binary data train obtained by integrally detecting a reproduced data train. This data train is inputted to the decoder 315, which then detects from the input data train a specific pattern through a logical operation and thus obtains the signals s and ph.

The signal s controls the switch 322 to selectively output the output of the subtracter 316 or the signal obtained by inverting the sign of the output of the subtracter 316 through the sign inverting circuit 321. The signal ph is supplied to a terminal $\overline{E}$ of the latch circuit 323 to control the latch circuit 323 in such a way as to sample and hold the output of the switch 322 at the timing of the signal ph.

Next, the details of how the signals s and ph are outputted are described as follows: FIG. 3(b) shows the eye pattern of the PR(1,0,−1) signal as mentioned above. The eye pattern has a ternary value at the data detecting point. The zero-cross point of the eye pattern indicates that a signal passing the zero-cross point has an inclination proportional to a phase difference between the data and the detecting point.

This inclination has either a positive or negative value. The decoder 315 is, therefore, arranged to obtain the signal s to determine this inclination to be a positive or negative inclination and to obtain the signal ph to determine the zero-cross point, so that a specific pattern included in the reproduced signal is detected by carrying out a predetermined logical operation. Hence, the level of the phase detection output 302 of the digital phase detecting circuit 30 is in proportion to the phase difference between the data and the data detecting point.

As apparent from the above-stated eye pattern, the inclination at the zero-cross point takes various values and the inclination of the phase comparison characteristic (phase detection sensitivity) also varies according to the pattern of the data. The variations, however, present no problem within the loop of the PLL because, in the PLL, variations take place only in the average value of loop gains.

Figure 6:
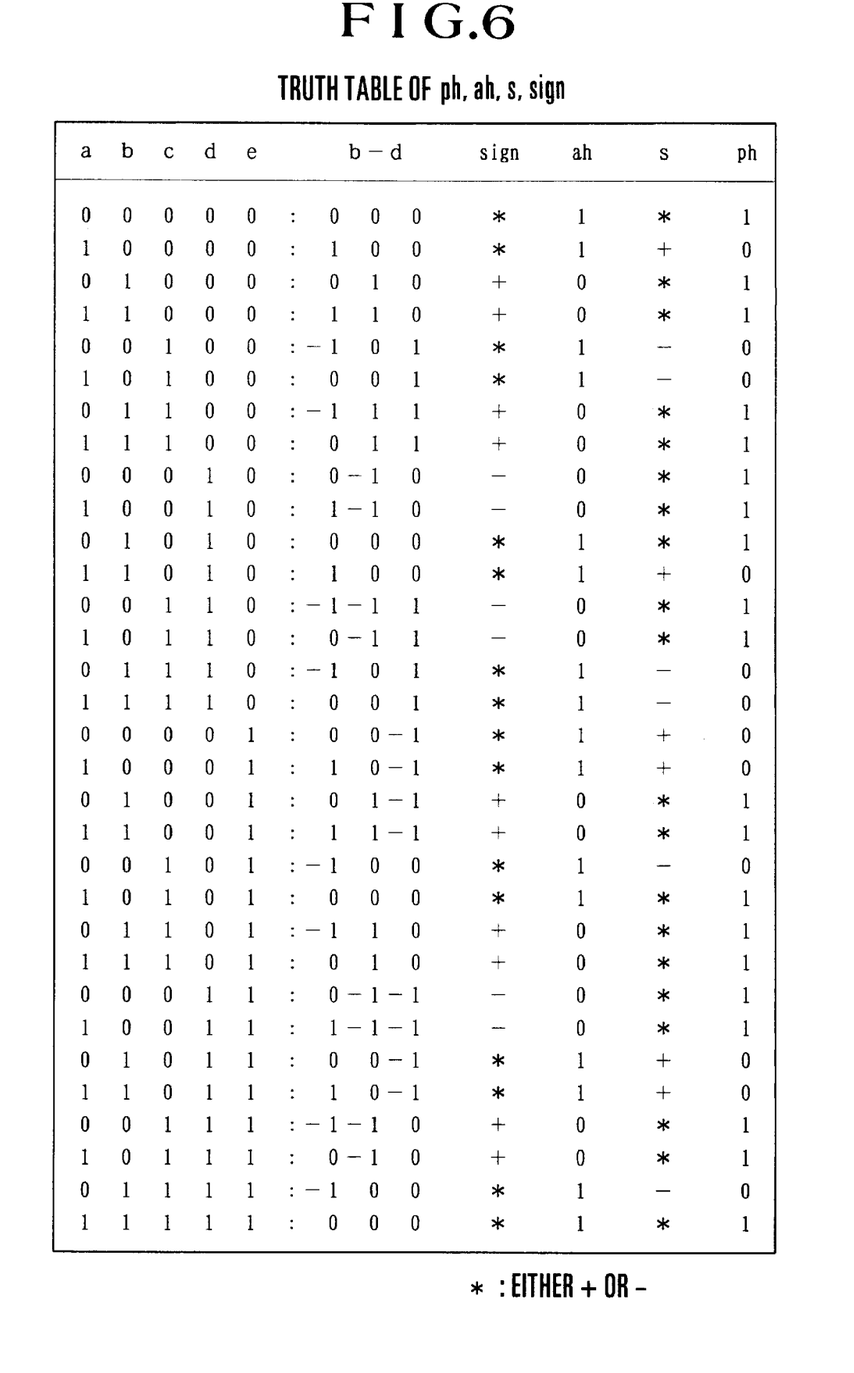
FIG. 6 shows the operation of the embodiment of this invention.

As mentioned above, this embodiment is arranged to obtain and output the signals s and ph by detecting a specific pattern through a logical operation from an integrally equalized data train. FIG. 6 shows by way of example a truth table of the signals s and ph.

In FIG. 6, there are shown logics of an output "b−d" of the subtracter 316 and the signals s and ph with respect to the integrally detected data a, b, c, d and e. The signal s indicates whether the inclination is positive or negative while the signal ph indicates whether the output "b−d" corresponds to the zero-cross point, that is, whether the data of the specific pattern is inputted. As apparent from this truth table, the signals s and ph can be expressed by a simple logical operation, for example, as expressed below:

$$ph = (b \oplus d) + \overline{ace} + ace$$
$$s = c$$

wherein ⊕ represents an EXOR.

This logic applies to where there is no error in the data a, b, c, d and e obtained by integral detection. A value of the phase detection output 302 varies in proportion to the phase difference between the data and the clock signal. A phase deviation results in data sampling at a wrong timing by the digital phase detecting circuit 30. Then, the phase detection output 302 is supplied via the loop filter 21 to the VCO 20 to cause the oscillation frequency of the VCO 20 to vary in such a way as to eliminate the phase difference between the reproduced signal and the clock signal, so that the operation of the device can be soon pulled into a phase locked state.

Figure 7:
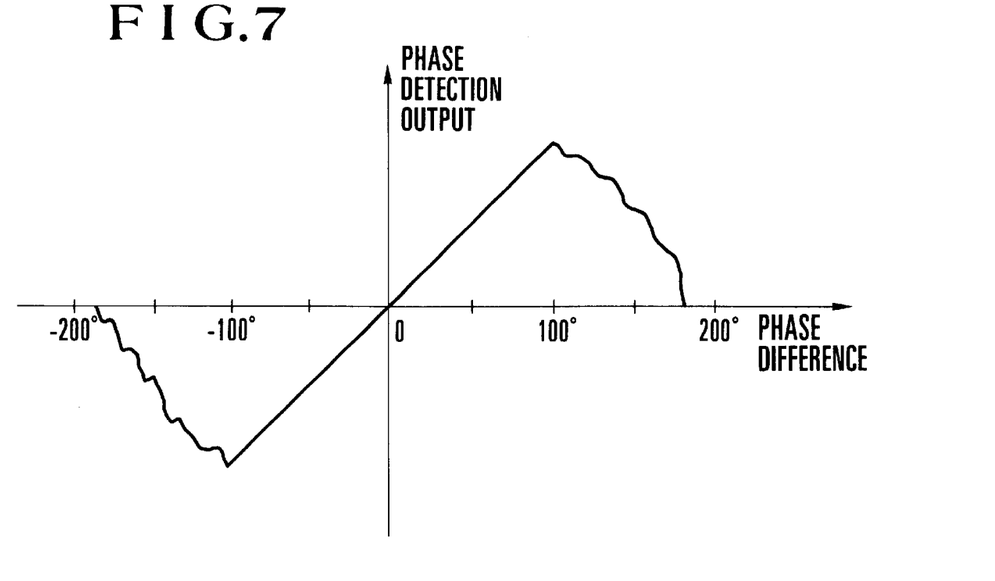
FIG. 7 shows the phase comparing characteristic of the circuit shown in FIG. 5.

FIG. 7 shows the phase comparison characteristic of the embodiment. As shown, the phase comparison characteristic is linear over a range of about ±100°⁻ and thus gives a sufficient phase lock range to the PLL.

With the PLL formed by the digital phase detecting circuit 30 to extract a clock signal like in the case of the embodiment, PR(1,0,−1) data sampled at the input timing of the clock signal can be controlled to be obtained stably at the zero-cross point. Therefore, the data can be accurately detected with the locking phase of the PLL automatically following the data detecting point. Further, with the loop filter 20 arranged to perform a digital operation, there arises no DC offset or the like which has been a problem with an analog circuit. As a result, it becomes no longer necessary to adjust the PLL of the device. The output of the VCO 20 is supplied not only to the A/D converter 5 but also to other applicable circuits of the apparatus as an operating clock signal.

Figure 8:
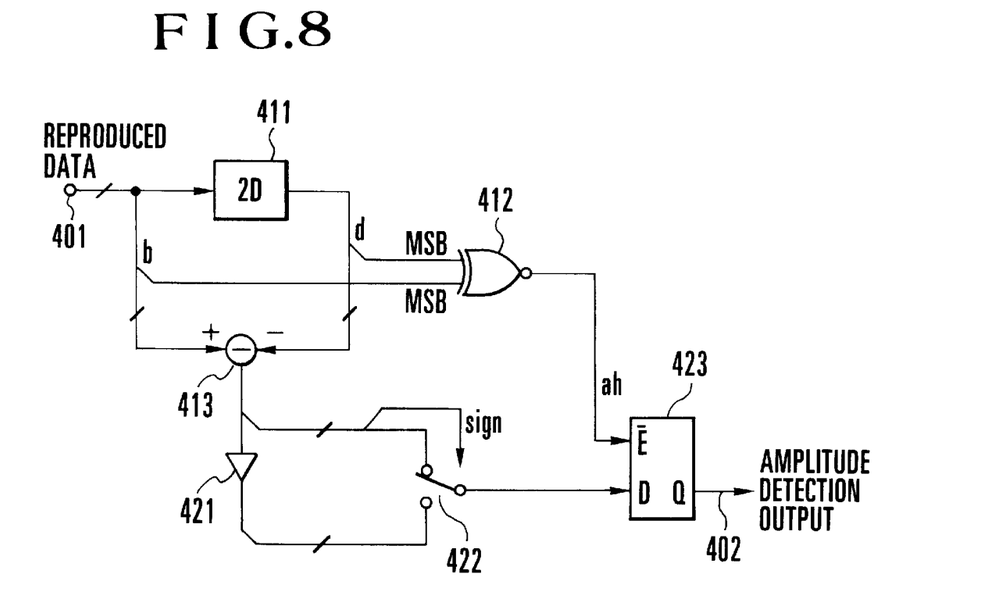
FIG. 8 is a block diagram showing the arrangement of a digital amplitude detecting circuit of the VTR shown in FIG. 4.

A digital amplitude detecting circuit 40 is next described with reference to FIG. 8, which is a block diagram showing in detail the arrangement of the digital amplitude detecting circuit 40. A delay circuit 411 is arranged to delay input data as much as the length of two clock pulses. An EXOR circuit 412 is arranged to obtain an exclusive OR of the input and output data of the delay circuit 411. A subtracter 413 is arranged to obtain data of the PR(1,0,−1) system by subtracting the output data from the input data. Elements 421, 422 and 423 are arranged to act in the same manner as the sign inverting circuit 321, the switch 322 and the latch circuit 323 of FIG. 5, except that the switch 422 is controlled by a signal "sign" which will be described later herein.

The PR(1,0,−1) data which is outputted from the subtracter 413 is of the eye pattern shown in FIG. 3(b). In other words, of the three values obtained at the data detecting point, two values obtained at points other than the zero-cross point indicate the amplitude of the reproduced data. The embodiment detects the amplitude of the detected data by detecting a specific pattern with the EXOR circuit 412 and by sampling and holding the data when the output of the subtracter 413 is at points other than the zero-cross point.

In detecting that the output of the subtracter 413 is at points other than the zero-cross point, the same method as the above-stated method used by the phase detecting circuit 30 is used. In other words, a specific pattern obtained when the output of the subtracter 413 is at points other than the zero-cross point is detected by means of the EXOR circuit 412 and a signal ah is supplied to the latch circuit 423. The latch circuit 423 then latches and output the data outputted from the switch 422 at the input timing of the signal ah.

The logic of the signal ah is shown at a column "ah" in FIG. 6. The latch circuit 423 acts when the signal ah is "0". Assuming that the results of binary detection of the input and output of the delay circuit 411 are b and d, the signal ah can be expressed as follows:

$$ah = \overline{b \oplus d}$$

With respect to the switching action of the switch 422, the sign (MSB) of the PR(1,0,−1) data may be used (middle data of a column "b–d" in the case of FIG. 6). However, it is apparent from the column "sign" of FIG. 6 that the inverted data of d or b may be used.

In the case of the embodiment, the amplitude of the reproduced signal is detected by detecting a specific pattern from the reproduced data when the PR(1,0,−1) data indicates an amplitude and by sampling and holding the PR(1,0,−1) data on the basis of the detection output. Therefore, an amplitude obtained at the data detecting point can be accurately detected.

With the loop filter 24 arranged to be a digital circuit, like in the case of the PLL described in the foregoing, the AGC loop also can be completely digitized. This arrangement obviates the necessity of any adjustment work, etc., that have been necessary for an analog circuit.

Since the data detecting point is detected by means of a simple logic circuit, the level of the detecting point can be accurately detected with a simple arrangement.

While the embodiment described above is arranged to perform the computing operation on the data of four bits, an adequate (S/N) characteristic can be obtained by using data consisting of five or less bits in general. Therefore, the number of bits, with respect to the data computing accuracy, may be reduced to two bits, for the purpose of reduction in circuit size, depending on the performance of the device desired.

In the embodiment described, pattern detecting circuits are provided respectively in the phase detecting circuit 30 and in the amplitude detecting circuit 40. However, since their actions are similar to each other, it is possible to arrange a single pattern detecting circuit in common for both the phase detecting circuit 30 and the amplitude detecting circuit 40. Therefore, in a second embodiment of this invention, only one pattern detecting circuit is arranged to be used in common. The second embodiment is described as follows.

Figure 9:
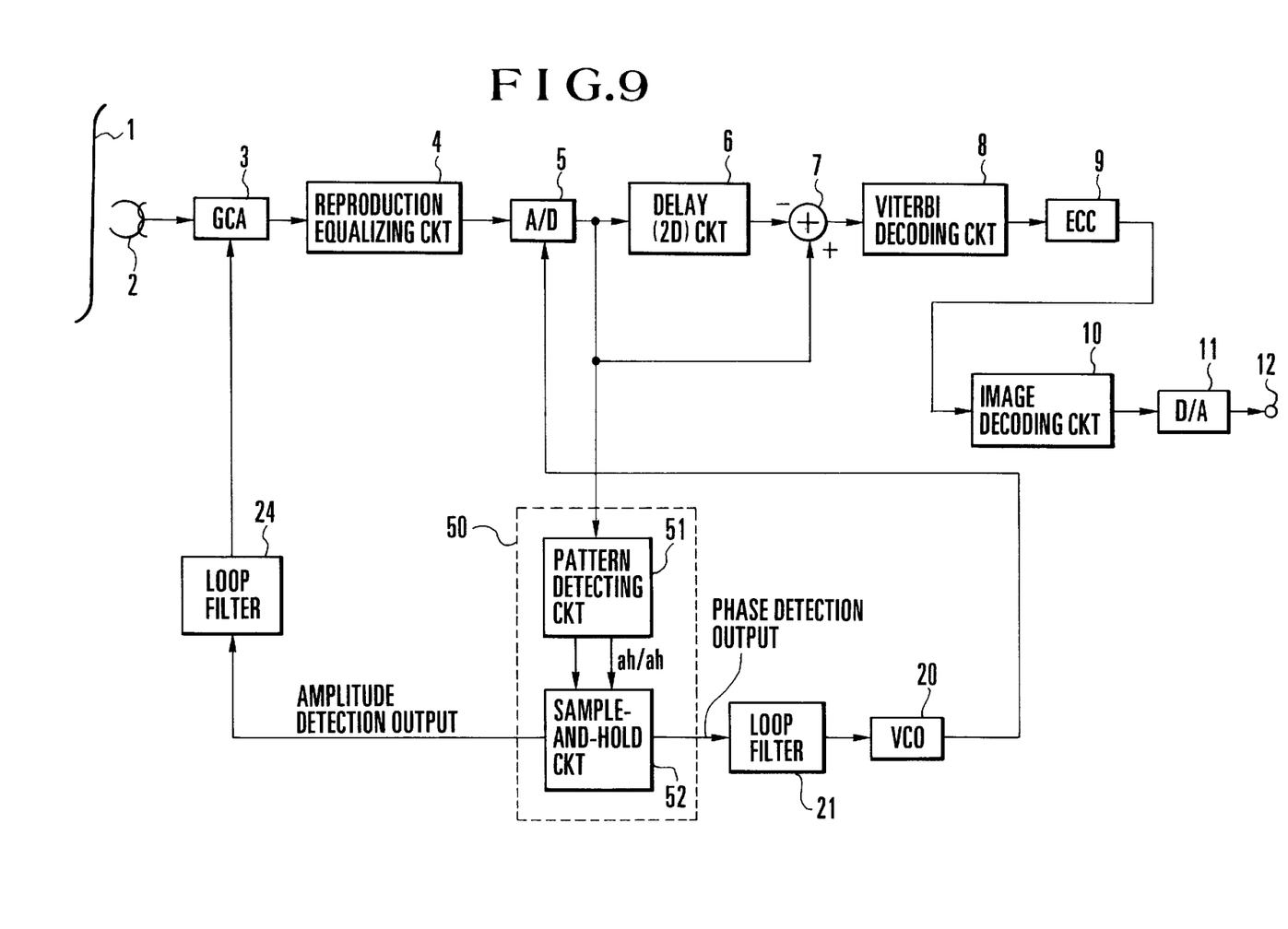
FIG. 9 is a block diagram showing a digital VTR arranged as another embodiment of this invention.

FIG. 9 shows the arrangement of a reproduction system of a digital VTR which is the second embodiment of this invention. Referring to FIG. 9, a phase-and-amplitude detecting circuit 50 is arranged to perform both a phase detecting action and an amplitude detecting action. With the exception of this circuit 50, all other parts of the second embodiment are identical with FIG. 4.

Figure 10:
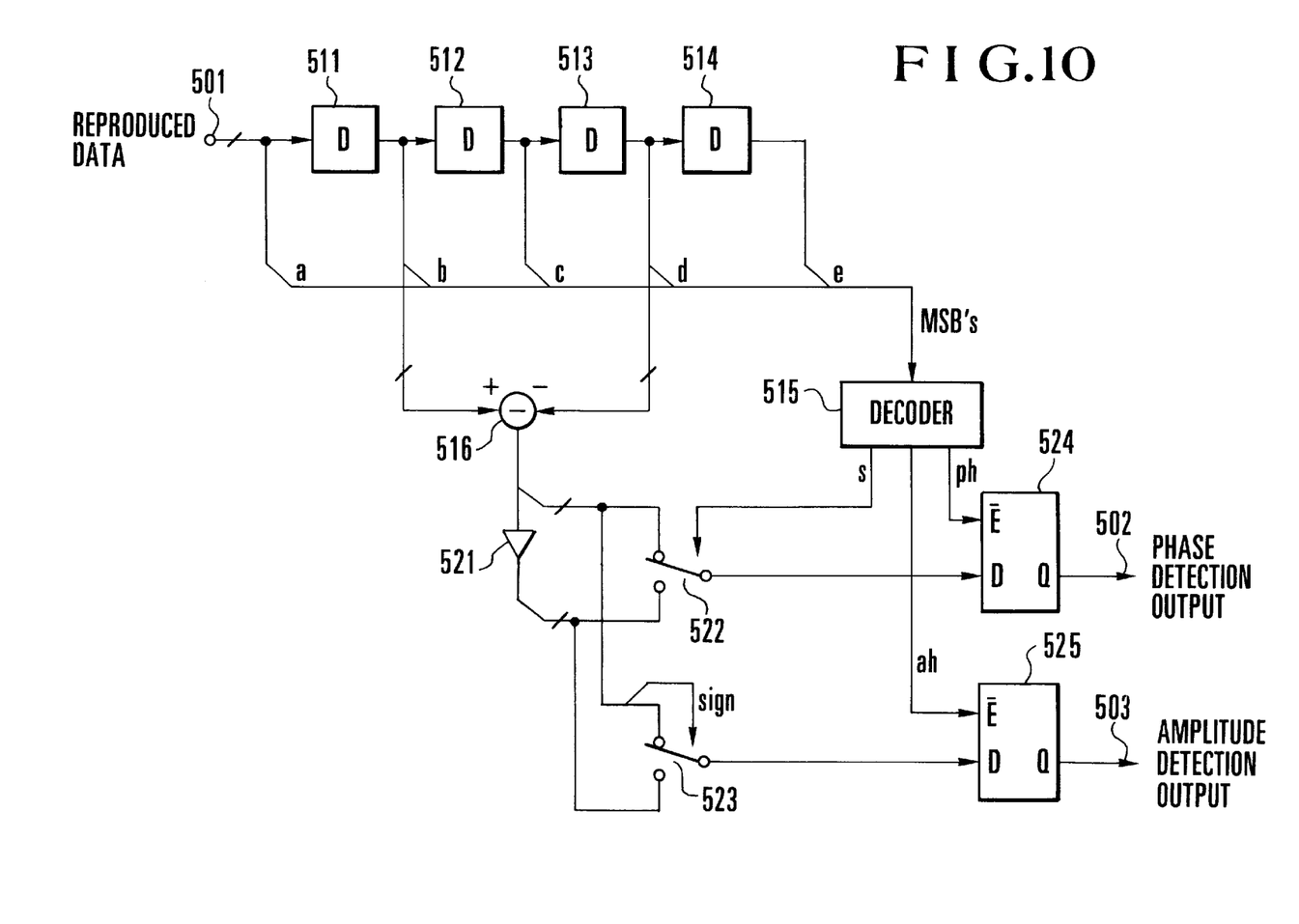
FIG. 10 is a block diagram showing the arrangement of a digital phase-and-amplitude detecting circuit included in the VTR of FIG. 9.

Details of the phase-and-amplitude detecting circuit 50 are as shown by way of example in FIG. 10.

Referring to FIG. 10, each of delay circuits 511 to 514 is arranged to delay input data 501 as much as the length of one clock pulse in the same manner as in the case of the delay circuits described in the foregoing. A decoder 515 is arranged to detect whether or not the PR(1,0,−1) data is at a zero-cross point by detecting a specific pattern and then to output signals s, ph and ah. The elements 511 to 516 jointly form a pattern detecting circuit 51.

A sign inverting circuit 521 is arranged to invert the sign of the output of a subtracter 516 and to output the result of inversion. Switches 522 and 523 are arranged to selectively output the data inputted to and outputted from the sign inverting circuit 521. Latch circuits 524 and 525 are arranged to latch the data outputted from the switches 522 and 523 respectively at the timing of the signals ph and ah. These elements 521 to 525 jointly form a sample-and-hold circuit 52. Further, the switch 522 is controlled by the signal s and the switch 523 by the signal "sign". A reference numeral 502 denotes a phase detection output and a numeral 503 an amplitude detection output.

The phase-and-amplitude detecting circuit 50 operates in about the same manner as the foregoing embodiment. When the decoder 515 detects by the above-mentioned logical operation a specific pattern which indicates that the data outputted from the subtracter 516 is at the zero-cross point, the decoder 515 sends the signal ph to the latch circuit 524. The signal ph causes the PR(1,0,−1) data outputted from the switch 522 to be sampled and held. Further, the decoder 515 sends the signal s which indicates the inclination of the detected data to the switch 522 to cause the switch 522 to select and output the data inputted to and outputted from the sign inverting circuit 521. The phase detection output 502 is smoothed by the loop filter 21 and is supplied to the VCO 20 to control the oscillation frequency of the VCO 20 as mentioned in the foregoing.

The amplitude detection is performed as follows. When the decoder 515 detects a specific pattern which indicates that the output of the subtracter 516 is not at the zero-cross point on the basis of the data b and d, the decoder 515 sends the signal ah to the latch circuit 525. As a result, the PR(1,0,−1) data outputted from the switch 523 is sampled and held. The switch 523 acts under the control of the signal "sign" to select the data inputted to and outputted from the sign inverting circuit 521. The amplitude detection output 503 is smoothed by the loop filter 24 and is then supplied to the GCA 3 to control the level of the reproduced signal in the same manner as mentioned in the foregoing.

Since the second embodiment is arranged to use a common pattern detecting circuit in detecting specific patterns and to detect both the phase and the amplitude on the basis of the detection outputs as described above, the embodiment not only accurately detects any phase deviation from the clock signal and the amplitude of the reproduced data at the data detecting point but also permits reduction in size of the circuit arrangement.

While this invention is applied to digital VTRs in the cases of the embodiments described, this invention is not limited to digital VTRs but is also advantageously applicable to a system of transmitting and reproducing binary data, such as a communication system using radio waves or light, an optical disk, etc. In such a case, a ternary value may be detected by some detecting system other than the PR(1,0,−1) system, such as a PR(1,−1) system or a PR(1,1) system, by arranging a phase-and-amplitude detecting circuit in a manner similar to the embodiment.

Figure 11:
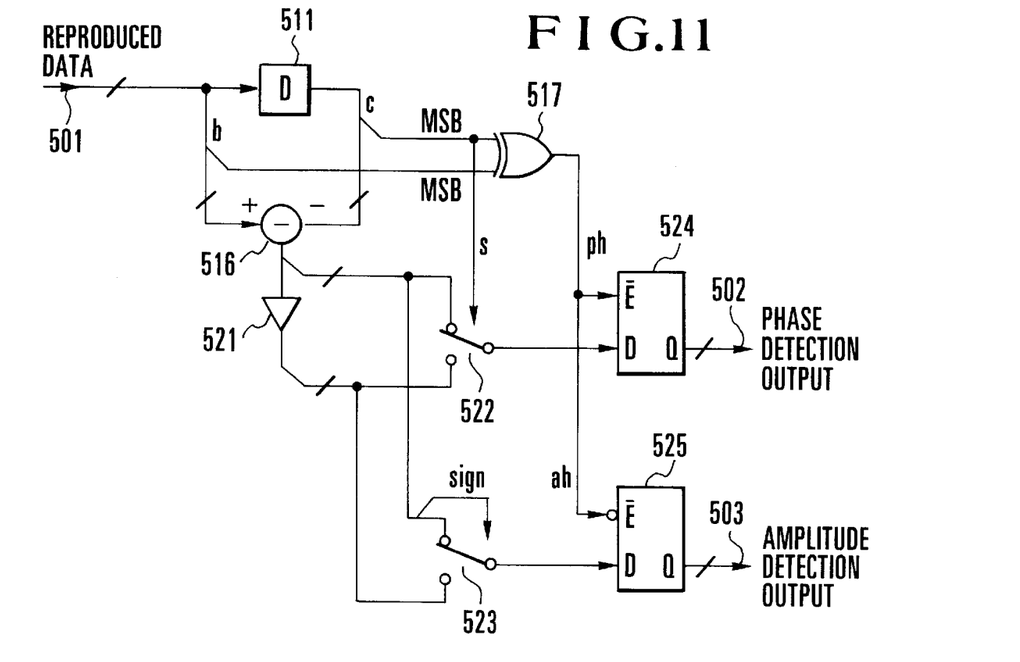
FIG. 11 is a block diagram showing another example of an arrangement of the digital phase-and-amplitude detecting circuit of the VTR of FIG. 9.
Figure 12:
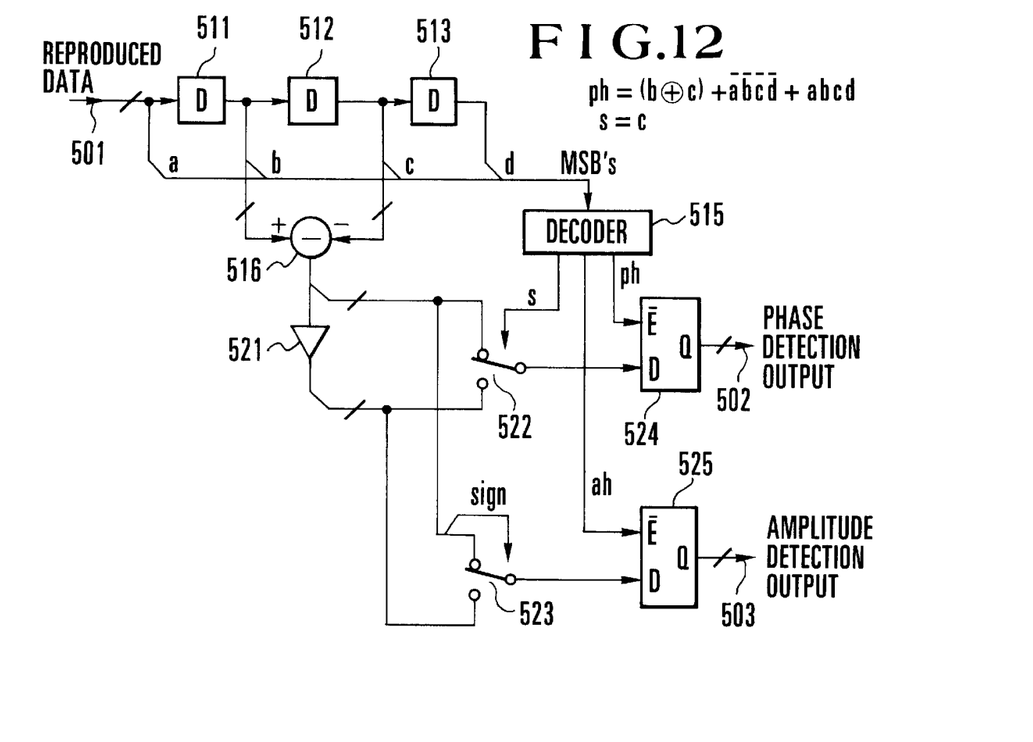
FIG. 12 is a block diagram showing a further example of arrangement of the digital phase-and-amplitude detecting circuit of the VTR of FIG. 9.

In the case of the PR(1,−1) system, for example, the digital phase-and-amplitude detecting circuit 50 is arranged as shown in FIG. 11 or 12. The examples shown in FIGS. 11 and 12 differ from the arrangement of FIG. 10 in that the subtracter 516 is arranged to obtain a difference between reproduced data and data delayed by the length of one clock pulse and that the decoder 515 has a different logic.

More specifically, the example shown in FIG. 11 uses only one delay circuit 511 and an EXOR gate 517 in place of the decoder 515. The signals ph and ah are obtained from data b and c which are the MSBs of the input and output of the delay circuit 511 while the data c is used also as the signal s.

In the case of another example shown in FIG. 12, three delay circuits 511, 512 and 513 are used. The MSBs of the delay outputs of these delay circuits 511, 512 and 513 and the MSB of the reproduced data 501 are supplied as data a, b, c and d to the decoder 515. The decoder 515 then obtains the signals ph and s by carrying out a logical operation, in accordance with a formula shown in FIG. 12, and the signal ah by detecting the inversion output of the EXOR gate obtained from the data b and c.

Each of the embodiments described is arranged to provide each detecting circuit with a delay circuit and a subtracter.

However, this arrangement can be changed to arrange the delay circuit 6 and the subtracter 7 of FIG. 4 or 9 to be used in common with each of the detecting circuits by omitting the delay circuits and subtracters of them. This change permits further reduction in size of the apparatus.

In accordance with this invention, as described in the foregoing, a specific pattern in the input digital signal is detected and the amplitude of the input digital signal is detected on the basis of a digital signal extracted according to the detection timing. By virtue of this arrangement, the amplitude of the reproduced signal can be accurately detected at the detecting point of the data having the specific pattern.

The level of the reproduced signal is controlled according to the amplitude of the reproduced signal detected in the above-stated manner. Therefore, the level of the reproduced signal can be kept unvarying at the detecting point of the data, so that errors in the reproduced data can be lessened.

The delayed data obtained by serially delaying the input digital data through delay means and the input digital signal are subjected to a binary discriminating and deciding process to obtain data of N bits. A logical operation is carried out using the N bit data. The results of an arithmetical operation carried out on two of the data outputted from the delay means are latched according to the result of logical operation. A latched value thus obtained is outputted as representing the amplitude of the input digital signal. An amplitude detection output is thus can be obtained directly from the input digital signal. Therefore, the level of the reproduced signal can be stably controlled. The arrangement not only obviates the necessity of adjustment work on the device and also lessens errors in processing the reproduced signal.

Further, in accordance with this invention, a specific pattern included in the input digital signal is detected, the amplitude of the input digital signal is detected on the basis of a digital signal extracted according to the timing of detection of the specific pattern, and a clock signal is generated in synchronism with the input digital signal. Therefore, the amplitude of the reproduced signal can be accurately detected at the detecting point of the data having the specific pattern and the clock signal can be generated in a state of being phase-locked to the data detecting point.

What is claimed is:

1. A digital signal processing device, comprising:
   a) pattern detecting means for detecting a specific data pattern included in a digital video signal and for outputting a pattern detection signal indicating the detection of the specific data pattern, the digital video signal consisting of a plurality of bits per sample;
   b) latching means for latching the input digital video signal of a pattern representing the specific pattern in response to the pattern detection signal output from said pattern detecting means and for outputting a latched signal consisting of a plurality of bits per sample; and
   c) level control means for receiving the latched signal consisting of a plurality of bits per sample from said latching means and for controlling the level of the input digital video signal according to a value represented by the latched signal consisting of a plurality of bits per sample.

2. A device according to claim 1, wherein said pattern detecting means is arranged to detect, as the specific data pattern, a plurality of patterns which differ from each other.

3. A device according to claim 1, wherein said pattern detecting means includes delay means for delaying the input digital signal as much as the length of N clock pulses (N: an integer which is at least one), and means for making a binary decision on the input digital signal and an output of said delay means and for detecting the specific data pattern by using data obtained as a result of the binary decision.

4. A device according to claim 3, wherein said latching means includes means for obtaining a difference between the input digital signal and the output of said delay means and for sampling and holding the difference in synchronism with the output of said pattern detecting means.

5. A device according to claim 1, wherein said pattern detecting means includes delay circuits which are interconnected in N steps (N: an integer which is at least one) to delay the input digital signal as much as the length of N clock pulses, and means for making a binary decision on N+1 data obtained from the input digital signal and said delay circuits and for detecting the specific data pattern by using data of N+1 bits obtained as a result of the binary decision.

6. A device according to claim 5, wherein said latching means includes means for obtaining a difference between two of the N+1 data and for sampling and holding the difference in synchronism with the output of said pattern detecting means.

7. A device according to claim 1, further comprising: delay means for delaying the input digital signal; and subtracting means for subtracting from the input digital signal a signal outputted from said delay means,
   wherein said pattern detecting means is arranged to detect as the specific pattern such a pattern in which no zero-cross point is generated between a plurality of samples of a digital signal continuously outputted from said subtracting means.

8. A device according to claim 1, wherein said pattern detecting means and said latching means are formed as digital circuits.

9. A digital signal processing device, comprising:
   a) delay means interconnected in N steps (N: an integer which is at least one) to delay input digital data as much as the length of N clocks, the input digital data consisting of a plurality of bits per sample;
   b) logical operation means for making a binary decision on N+1 samples of digital data of a plurality of bits per sample obtained from the input digital data to be input to said delay means and each step of said delay means and for performing a predetermined logical operation by using data of N+1 bits obtained as a result of the binary decision;
   c) arithmetical operation means for obtaining either a difference between or a sum of two of the N+1 samples of digital data of a plurality of bits per sample and for outputting an operation result consisting of a plurality of bits per sample; and
   d) latch means for latching the operation result consisting of a plurality of bits per sample output from said arithmetical operation means in response to an output of said logical operation means and for outputting a latched signal consisting of a plurality of bits per sample as a signal indicative of an amplitude of the input digital data, a level of said input digital data being controlled according to a value represented by the latched signal consisting of a plurality of bits per sample.

10. A device according to claim 9, wherein said logical operation means is arranged to detect, on the basis of the N+1 digital data, whether or not data of a plurality of samples continuously outputted from said arithmetical operation means corresponds to a zero-cross point.

11. A device according to claim 9, wherein said logical operation means is arranged to perform a logical operation to decide whether the data outputted from said arithmetical operation means has a positive inclination or a negative inclination.

12. A digital signal processing device, comprising:
   a) input means for receiving an input digital signal having a characteristic corresponding to a partial response (1,0,−1) system, the digital input signal consisting of a plurality of bits per sample;
   b) data detecting means for detecting a zero-cross point between a plurality of continuous samples of an eye pattern of the input digital signal and for outputting a data detection signal indicating the detection of the zero-cross point; and
   c) latch means for latching the input digital signal of a part representing the zero-cross point in response to the data detection signal output from said data detection means and for outputting a latched signal consisting of a plurality of bits per sample as a signal indicative of an amplitude of the input digital signal, a level of said input digital signal being controlled according to a value represented by the latched signal consisting of a plurality of bits per sample.

13. A device according to claim 12, wherein said input means includes means for controlling the level of the input digital signal on the basis of the output of said latching means.

14. A device according to claim 12, further comprising Viterbi decoding means, said input digital signal consisting of a plurality of bits per sample, for detecting a digital signal consisting of one bit per sample from the input digital signal by using a Viterbi algorithm.

15. A device according to claim 12, wherein said input means includes means for receiving a digital signal and processing means for carrying out a process which corresponds to the partial response (1,0,−1) system on the digital signal coming from said receiving means.

16. A device according to claim 12, wherein said latch means includes means for sampling the input digital signal in response to said data detecting means detecting that there is a no zero-cross point between the plurality of samples.

17. A device according to claim 12, further comprising generating means for sampling the input digital signal in response to said data detecting means detecting that there is a zero-cross point between the plurality of samples, and for generating a clock signal which is phase-locked to the input digital signal on the basis of the sampled input digital signal.

18. A video signal reproducing apparatus, comprising:
   a) reproducing means for reproducing a digital video signal consisting of a plurality of bits per sample from a recording medium;
   b) pattern detecting means for detecting a specific data pattern included in the reproduced digital video signal and for outputting a pattern detection signal indicating the detection of the specific data pattern;
   c) extracting means for extracting a part of the reproduced digital video signal representing the specific data pattern in response to the pattern detection signal output from said pattern detecting means and for outputting an extracted signal consisting of a plurality of bits per sample;
   d) level control means for receiving the extracted signal consisting of a plurality of bits per sample from said extracting means and for controlling a level of the reproduced digital video signal according to a value represented by the extracted signal consisting of a plurality of bits per sample; and
   e) generating means for receiving the extracted signal consisting of a plurality of bits per sample from said extracting means and for generating a clock signal which is phase-synchronized with the reproduced digital video signal according to a value represented by the extracted signal consisting of a plurality of bits per sample.

19. An apparatus according to claim 18, wherein said extracting means has latch means for latching the reproduced digital video signal according to the output of said pattern detecting means.

20. An apparatus according to claim 19, wherein said control means controls the amplitude of the reproduced digital video signal.

21. An apparatus according to claim 19, wherein said generating means includes a loop filter to which an output of said latch means is arranged to be inputted, and oscillating means for outputting as the clock signal a signal of a frequency corresponding to an output of said loop filter.

22. A digital signal processing device, comprising:
   a) pattern detecting means for detecting a specific data pattern included in an input digital video signal consisting of a plurality of bits per sample and for outputting a pattern detection signal indicating a detection of the specific data pattern; and
   b) sampling means for sampling and holding the input digital video signal of a part representing the specific data pattern in response to the pattern detection signal output from said pattern detecting means and for outputting a sampled and held digital signal consisting of a plurality of bits per sample as a signal indicative of an amplitude of the input digital video signal, a level of the input digital video signal being controlled according to a value represented by the sampled and held digital signal consisting of a plurality of bits per sample.

23. A device according to claim 22, wherein said pattern detecting means is arranged to detect as the specific data pattern a plurality of patterns which differ from each other.

24. A device according to claim 22, further comprising control means for controlling the level of the input digital signal according to an output of said sampling means.

25. A method for processing digital signals, comprising the steps of:
   detecting a specific data pattern included in an input digital video signal and outputting a pattern detection signal indicating the detection of the specific data pattern, the input digital video signal consisting of a plurality of bits per sample;
   latching the input digital video signal of a pattern representing the specific data pattern in response to the output of the pattern detection signal and outputting a latched signal consisting of a plurality of bits per sample; and
   controlling the level of the input digital video signal according to a value represented by the latched signal consisting of the plurality of bits per sample.

26. A method according to claim 25, wherein a plurality of patterns which differ from each other are detected as the specific data pattern.

27. A method according to claim 25, wherein, in detecting the specific data pattern, the input digital signal is delayed as much as the length of N clock pulses (N: an integer which is at least one), the input digital signal and the delayed digital signal are subjected to a process of binary decision, and the specific data pattern is detected by using data obtained as a result of the process of binary decision.

28. A method according to claim 27, wherein, in latching the input digital signal, a difference between the input digital signal and the delayed digital signal is obtained, and the difference is sampled and held in synchronism with the detection pattern.

29. A method according to claim 25, wherein, in detecting the specific data pattern, the input digital signal is delayed as much as the length of N clock pulses (N: an integer which is at least one) by N delaying steps, N+1 data composed of the input digital signal and the delayed signal outputs are subjected to a process of binary decision, and the specific data pattern is detected by using data of N+1 bits obtained as a result of the process of binary decision.

30. A method according to claim 29, wherein, in latching the input digital signal, a difference between two of the N+1 data is obtained, and the difference is sampled and held in synchronism with the detection pattern.

* * * * *

UNITED STATES PATENT AND TRADEMARK OFFICE
CERTIFICATE OF CORRECTION

PATENT NO.    : 6,374,035 B1
DATED         : April 16, 2002
INVENTOR(S)   : Shinichi Yamashita It is certified that error appears in the above-identified patent and that said Letters Patent is hereby corrected as shown below:

<u>Column 6,</u>
Line 12, "±100°" and insert -- ±100° --.

Signed and Sealed this

Twenty-sixth Day of November, 2002

Attest:

Attesting Officer

JAMES E. ROGAN
*Director of the United States Patent and Trademark Office*